United States Patent [19]

Murray et al.

[11] Patent Number: 5,593,165
[45] Date of Patent: Jan. 14, 1997

[54] CIRCUMFERENTIAL FLOW CHANNEL FOR CARBON SEAL RUNNER COOLING

[75] Inventors: Stephen G. Murray, Indianapolis; Joseph C. Smith, Plainfield, both of Ind.

[73] Assignee: Allison Engine Company, Inc., Indianapolis, Ind.

[21] Appl. No.: 309,081

[22] Filed: Sep. 20, 1994

[51] Int. Cl.⁶ ........................................... F02C 7/28
[52] U.S. Cl. .................. 277/22; 277/68; 277/192; 277/214; 415/110; 415/111; 415/175
[58] Field of Search .................................. 277/22, 67, 68, 277/163, 192, 214, DIG. 8; 415/110, 111, 112, 115, 116, 175

[56] References Cited

U.S. PATENT DOCUMENTS

| | | |
|---|---|---|
| 1,937,461 | 11/1933 | Mylting . |
| 2,451,944 | 10/1948 | Hall . |
| 2,598,381 | 5/1952 | Hoffman ................................. 277/67 |
| 2,956,824 | 10/1960 | Kuchler et al. ......................... 277/22 |
| 2,992,842 | 7/1961 | Shevchenko et al. .................. 277/22 |
| 3,347,553 | 10/1967 | Schweiger .............................. 415/175 |
| 3,554,661 | 1/1971 | Oglesby et al. ........................ 415/111 |
| 3,806,135 | 4/1974 | Wiese . |
| 4,613,280 | 9/1986 | Tate ......................................... 415/110 |
| 4,917,218 | 4/1990 | Murray ..................................... 415/175 |
| 4,969,652 | 11/1990 | Munson ..................................... 277/22 |
| 5,272,868 | 12/1993 | Ciokajlo et al. . |
| 5,284,347 | 2/1994 | Pope ......................................... 415/115 |
| 5,295,798 | 3/1994 | Maruyama et al. . |
| 5,301,957 | 4/1994 | Hwang et al. . |

*Primary Examiner*—William A. Cuchlinski, Jr.
*Assistant Examiner*—Scott W. Cummings
*Attorney, Agent, or Firm*—Woodard, Emhardt, Naughton, Moriarty & McNett

[57] ABSTRACT

A fluid cooled seal arrangement for a gas turbine engine including a first sealing element coupled to a mechanical housing of the engine, and a second sealing element connected to a shaft rotatable within the housing. The first and second sealing elements are arranged radially adjacent to one another to form a rubbing interface therebetween. A lubrication system for delivering cooling fluid to the second sealing element through a passageway arranged along the rotating shaft. The cooling fluid is discharged through a plurality of openings formed in one end of the passageway. During normal operation of the engine the centrifugal force from the rotation of the shaft flings the oil radially outward to a channel formed on the underside of the second sealing element. The channel receives the cooling fluid therein, and allows for the escape of the cooling fluid onto the underside of the second sealing element to provide a uniform thickness of cooling fluid thereon. A uniform film of cooling fluid will result in the more uniform transfer of heat from the second sealing element.

39 Claims, 4 Drawing Sheets

CIRCUMFERENTIAL FLOW CHANNEL FOR CARBON SEAL RUNNER COOLING

BACKGROUND OF THE INVENTION

The present invention relates generally to the design and construction of seal systems useful in a gas turbine engine. More particularly, the present invention has one application with a carbon seal system having a rotating seal runner with a flow channel for uniformly distributing cooling fluid. Although the invention was developed for use in a gas turbine engine, certain applications may be outside of this field.

It is well known that a gas turbine engine integrates a compressor and a turbine that have components that rotate at extremely high speeds relative to each other, and across which there are pressure differentials that make the provision of seals for minimizing fluid leakage very important. Prior designers of seal systems have generally used a sealing device consisting of a plurality of arcuate carbon material segments arranged to form a stationary carbon ring that forms a rubbing interface with a rotating seal runner.

The rubbing interface between the rotating seal runner and the carbon ring minimizes or prevents the leakage of fluid through the seal, however if the heat generated by the rubbing interface is not adequately dissipated the resulting fluid leakage at the seal interface may become excessive. A failure to control the temperature of the rotating seal runner can result in thermal distortion of the seal runner and a corresponding degradation of the seal's performance that is manifested by an excessive fluid leakage.

A carbon seal system requires the precise geometric fit between the stationary carbon ring and the rotating seal runner to assure that an intimate rubbing interface is obtained between the mating components. The rubbing interface between the mating components is critical to the performance of the seal, and certain tolerances associated with the seal components are measured in millionth of an inch. In order to maintain the precision geometric fit between the mating components of the rubbing interface, prior designers of carbon seal systems have typically utilized a fluid cooling medium to extract excessive heat from the seal runner.

The conventional technique utilized to minimize the overheating of the seal interface includes the delivery of a cooling fluid onto the underside of the rotating seal runner. One approach to delivering the cooling fluid onto the underside of the rotating seal runner is to spray the cooling fluid from a stationary nozzle that is positioned proximate the seal runner. The relative motion between the rotating seal runner and the stationary nozzle causes a uniform film of cooling fluid to be deposited on the seal runner that results in a uniform extraction of thermal energy from the runner. Stationary nozzles provide a consistently even film of cooling fluid on the underside of the rotating seal runner, however their applicability on many gas turbine engines is limited by physical constraints that prevent the nozzle from being located proximate the seal runner.

A second approach to delivering the cooling fluid utilizes a rotating distributor to deliver the cooling fluid onto the underside of the rotating seal runner. The rotating distributor is typically affixed to the seal runner, and a steady stream of cooling fluid is delivered through a central passageway in the rotating distributor to the underside of the seal runner. A series of openings in the rotating distributor dispense the cooling fluid onto the seal runner. Inherently, because of the absence of relative motion between the distributor and the seal runner there is an inevitable uneven distribution of cooling fluid on the underside of the seal runner. Prior designs have utilized a greater quantity of openings formed at one end of the central passageway in order to produce a more even distribution of cooling fluid on the underside of the rotating seal runner.

It is generally well known that a carbon seal system having a rotating distributor must include a large quantity of openings in order to deliver an even film of cooling fluid on the underside of the seal runner. If this design parameter is not satisfied, an uneven film of cooling fluid is distributed across the seal runner, which causes an uneven extraction of heat.

This uneven extraction of heat can lead to the warping and deformation of the seal runner that will result in gaps between the seal runner and the carbon sealing element. Any voids, openings, or gaps in the rubbing interface of the seal system will cause excessive fluid leakage through the seal. A carbon seal system design having a large quantity of cooling fluid dispensing openings can be utilized, however as the quantity of openings increase there arises significant complexity in interconnecting the components. Manufacturing concerns will serve to limit the quantity of cooling fluid dispensing openings that can be utilized, this in turn will effect the evenness of the distribution of cooling fluid on the seal runner and the associated heat transfer therefrom.

Even with a variety of early designs there remains a need for an improved sealing system. The present invention satisfies this need in a novel and unobvious way.

SUMMARY OF THE INVENTION

One embodiment of the present invention contemplates a fluid cooled seal arrangement. The apparatus comprises: a mechanical housing; a shaft rotatably mounted within the housing; a first sealing element coupled to the housing; a second sealing element connected to the shaft; the second sealing element arranged adjacent to the first sealing element to form rubbing interface therebetween; a channel on the radially inward side of the second sealing element for receiving cooling fluid therein and allowing escape of received cooling fluid at a plurality of points along its length and preferably uniformly along its entire length; and a passageway along the shaft for delivering cooling fluid to the channel for cooling the second sealing element.

One object of one form of the present invention is to provide an improved carbon seal system for a gas turbine engine.

Related objects and advantages of the present invention will be apparent from the following description.

DESCRIPTION OF THE PREFERRED EMBODIMENT

Figure 1:
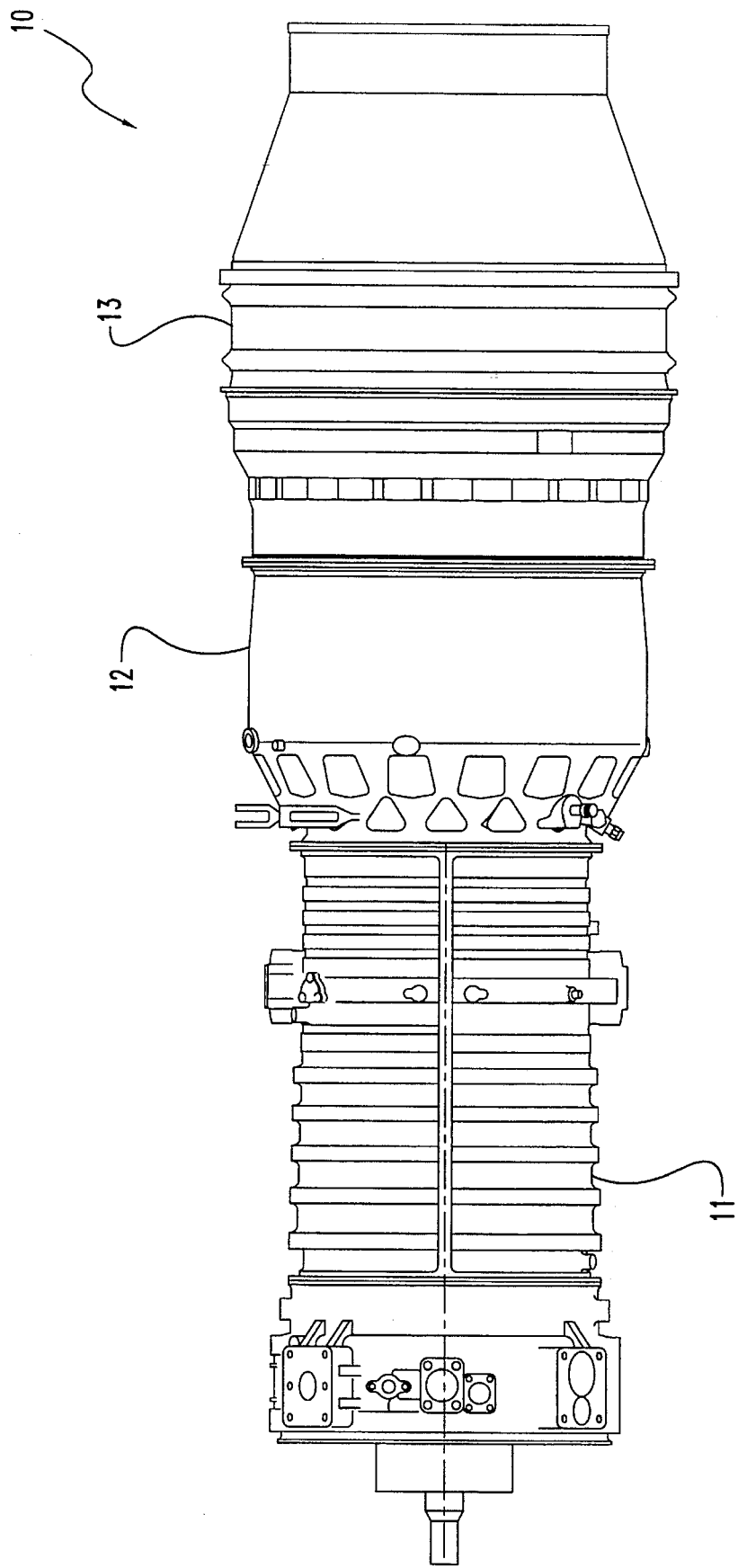
FIG. 1 is a side elevational view of a gas turbine engine using the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a gas turbine engine 10 which includes a compressor 11, a combustor 12, and a power turbine 13. The three components have been integrated together to produce an aircraft flight propulsion engine. One aircraft engine of this general type is model AE2100, that is produced by Allison Engine, Inc., of Indianapolis, Ind. It is important to realize that there are a multitude of ways in which the components could be linked together. Additional compressors and turbines could be added, with intercoolers connecting between the compressors, and reheat combustion chambers could be added between the turbines. Further, a gas turbine engine is equally well suited to be used for industrial applications. Historically, there has been widespread application of industrial gas turbine engines, such as pumping sets for gas and oil transmission lines, electricity generation, and naval propulsion.

Figure 2:
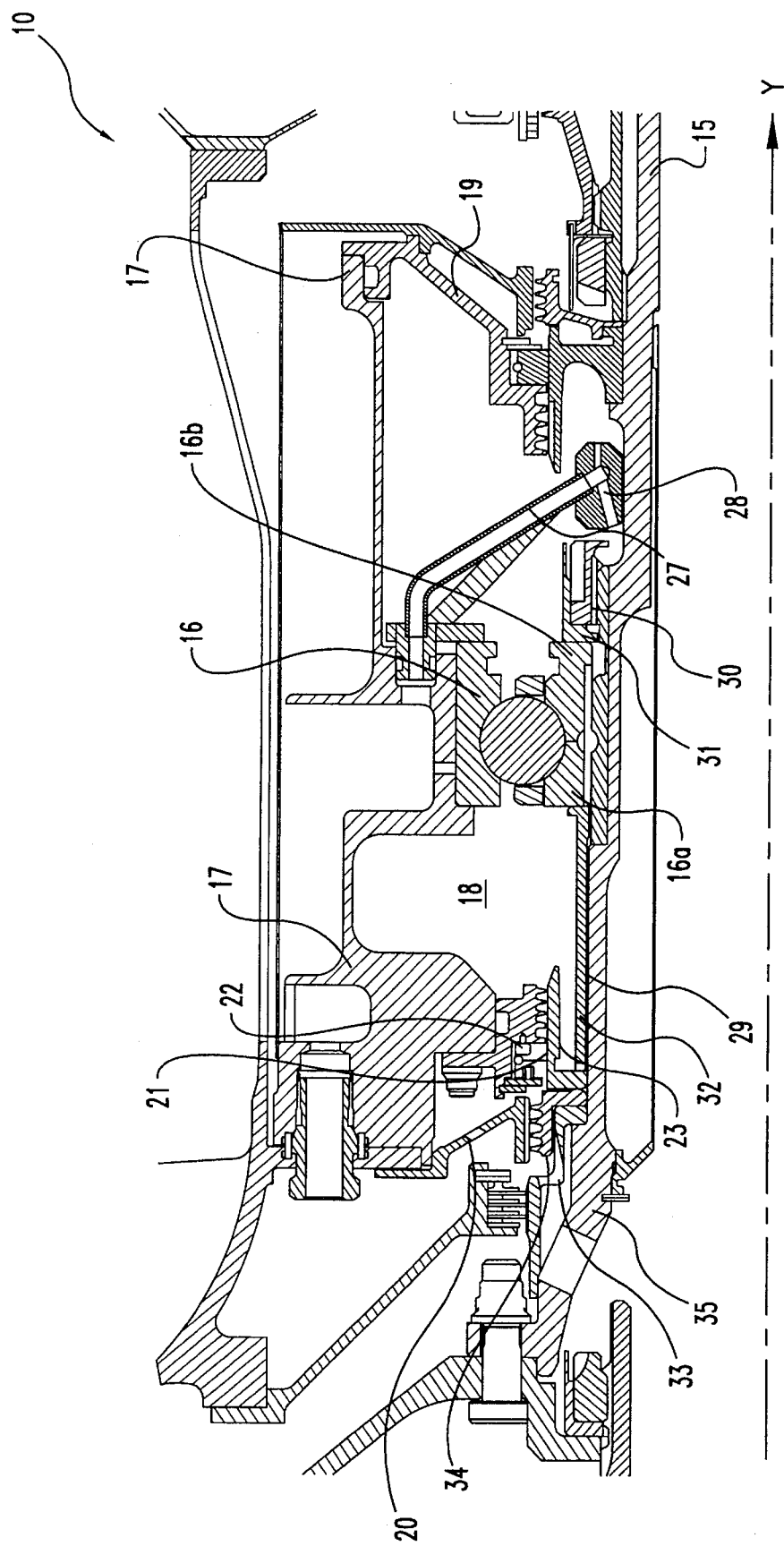
FIG. 2 is a fragmentary sectional view of the FIG. 1, gas turbine engine showing a fluid cooled seal arrangement according to one embodiment of the present invention.
Figure 3:
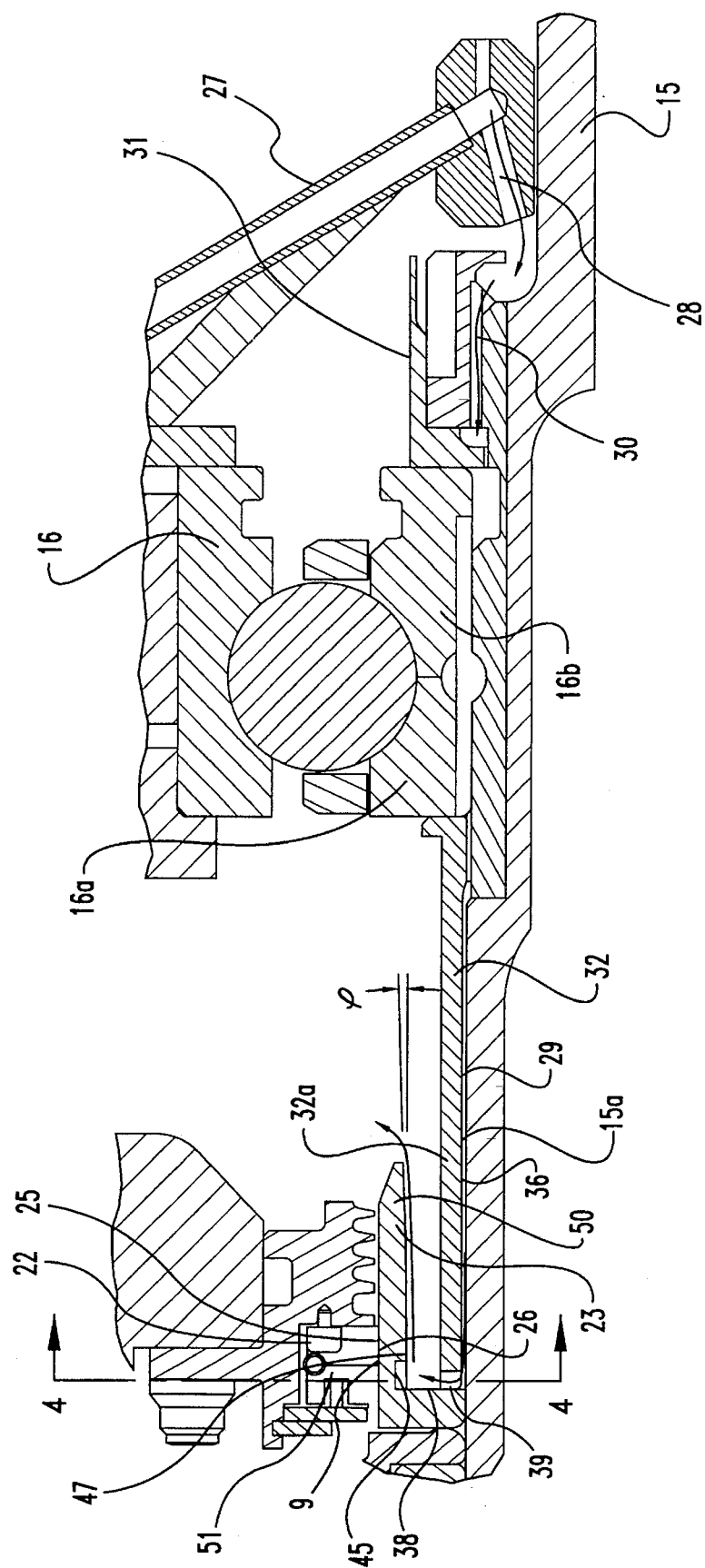
FIG. 3 is an enlarged fragmentary view of the fluid cooled seal arrangement of FIG. 2.

With reference to FIGS. 2 and 3, there is illustrated a fragmentary sectional view of the gas turbine engine 10 of FIG. 1. A tubular shaft 15 is rotatably mounted within the gas turbine engine 10 about a longitudinal axis Y of the engine 10. The shaft 15 is supported on a plurality of bearings that are disposed between the shaft 15 and a rigid housing that forms a portion of the engine 10. One of the plurality of bearings is a bearing 16 that is coupled to a mechanical housing 17 of the engine 10. The volume defined between the shaft 15 and the mechanical housing 17 is a sump 18 in which the bearing 16 is disposed.

The sump 18 functions as a reservoir for cooling fluid that is utilized to cool and lubricate the mechanical components of the gas turbine engine 10 such as bearing 16. An annular barrier 19 is attached to the rear of mechanical housing 17, to close one end of the sump 18, and includes a plurality of seals which minimize or prevent the leakage of cooling fluid between the shaft 15 and the barrier 19. The sump 18 is closed at its forward end by a second annular barrier 20 that is affixed to the mechanical housing 17. A plurality of seals are disposed between mechanical housing 17 and the shaft 15 that is rotatably mounted within mechanical housing 17. One of the plurality of seals is a fluid cooled seal arrangement 21. In the preferred embodiment the fluid cooled seal arrangement 21 is a carbon seal system that includes a stationary component and a rotating component.

The stationary component has a first sealing element 22 that is coupled to the mechanical housing 17. While the rotating component has a second sealing element 23 that is mechanically connected to the rotating shaft 15. It is well known that the rotating component of this sealing arrangement is known as a seal runner. The first sealing element 22 is positioned axially concentric with and radially outward from the second sealing element 23. In the preferred embodiment the sealing elements 22 and 23 are arranged adjacent to each other to form a rubbing interface therebetween. A first cylindrical surface 25 is formed on the radially inward side of the first sealing element 22, and a second cylindrical surface 26 is formed on the radially outward side of the second sealing element 23. At least a portion of the cylindrical surfaces 25 and 26 are maintained in rubbing contact to form a fluid tight seal at the rubbing interface 9.

The lubrication system, which normally provides cooling fluid under pressure to lubricate and cool the moving parts of the engine, such as the bearing 16 and the second sealing element 23, delivers its fluid through nozzle 27. The cooling fluid is pressurized by a pump (not illustrated) to a pressure of about 30 pounds per square inch gage. The pump discharges the fluid from the nozzle orifice 28 with sufficient kinetic energy to traverse the cavity 8 that is positioned between the nozzle orifice 28 and the nut 31. The nozzle 27 is connected to the mechanical housing and is disposed within the oil sump 18. In the preferred embodiment the cooling fluid is an engine oil having a viscosity that is suited for the high temperatures associated with a gas turbine engine 10. The nozzle 27 includes a discharge orifice 28 which directs the cooling fluid into a passageway 29 that is positioned along the tubular shaft 15. In the preferred embodiment the passageway 29 has oil flowing through it for use as a cooling fluid. Further, before the cooling fluid enters the passageway 29 it passes through a pathway 30 in nut 31 and adjacent the-bottom side 16a of bearing 16. In an alternate form of the present invention the discharge orifice 28 discharges the cooling fluid directly into the passageway 29.

The bearing 16 has an inner race 16b that is retained on the tubular shaft 15 by the nut 31 that is threaded on the shaft 15. The nut 31 captures the inner race 16b of bearing 16, a spacer 32, the second sealing element 23, and a pair of other sealing devices 33 and 34 against a shoulder 35 of the shaft 15. The spacer 32 and the second sealing element 23 rotate together with the tubular shaft 15.

Figure 4:
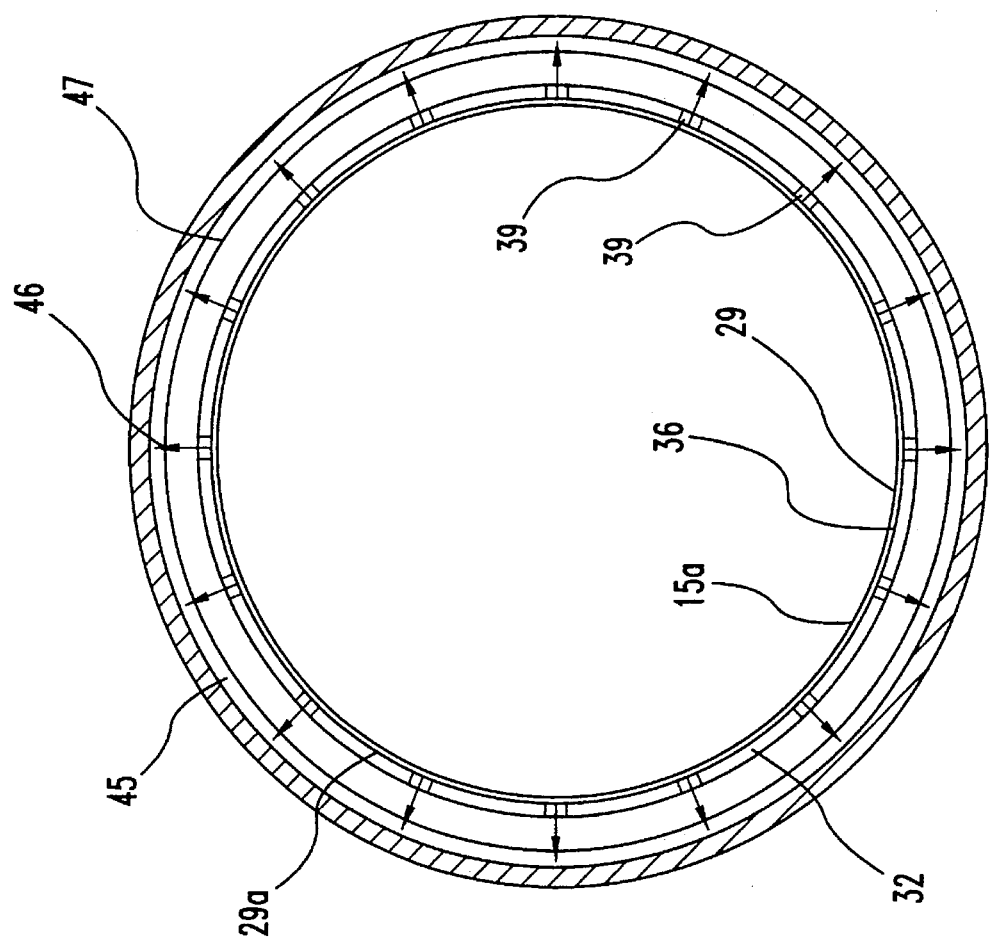
FIG. 4 is an illustrative end view in full section of the fluid passageway and flow channel comprising a portion of the FIG. 3 combination.

With reference to FIGS. 3 and 4, the components which comprise the fluid cooled seal arrangement 21 will be described in further detail. In the preferred embodiment the passageway 29 is formed adjacent the tubular shaft 15 between the radial inward cylindrical surface 36 of spacer 32 and the circumferential surface 15a of tubular shaft 15. The passageway 29 provides a pathway for the axial flow of cooling fluid to a substantially solid planar surface 38 that forms a portion of the second sealing element 23. In the preferred embodiment the substantially solid planar surface 38 extends radially outward from the tubular shaft 15. This planar surface 38 prevents any further axial flow of the cooling fluid and helps direct the fluid to flow in a substantially radial direction. Alternatively, the surface may contain contours to aid in the addition of a circumferential flow component. In the preferred embodiment a plurality of openings 39 are formed on one end of passageway 29 that is disposed adjacent to the substantially solid planar surface 38. In an alternate embodiment (not illustrated) the openings may be formed at an axial distance from the planar surface 38.

In the preferred embodiment the openings 39 are formed by machining a rectangular opening or slot through the cylindrical wall 32a of spacer 32. In alternate embodiments the geometric shape of the openings formed in the spacer 32 corresponds to other polygons, circular or other geometric shapes. In one form of the present invention there are at least four openings formed on the passageway. In the preferred embodiment there are at least about sixteen openings 39 formed about the circumference of the passageway 29. The openings 39 are spaced symmetrically about the circumference 29a of the passageway 29. Further, the openings are axially aligned and spaced a radial distance from a channel 45 that is machined in the second sealing element 23. Alternatively, the channel 45 can be formed by any other means which provide the desired geometric relationships.

The channel 45 is formed on the radially inward side 23a of the second sealing element 23 and preferably has an axial width that is about twice as wide as its radial depth. The channel 45 extends uninterrupted around the second sealing element. It is understood that the geometric relationship between the width and depth of the channel 45 will vary depending upon other parameters of the seal system, such as the number of openings 39 in the passageway, the size and shape of the openings, and the volumetric flow rate of the cooling fluid. The channel 45 is designed and constructed for receiving cooling fluid therein that has been released through the plurality of openings 39 in passageway 29. As the cooling fluid exits the openings 39 of passageway 29 it is thrown radially outward by centrifugal forces during normal engine operation.

As the cooling fluid is received in the channel 45 it flows circumferentially through the channel until the channel is full. When the channel 45 is completely full of cooling fluid it allows the cooling fluid to escape at a plurality of points along its length. In the preferred embodiment the plurality of points define a continuous line that corresponds to the entire circular edge 47 of channel 45. After the cooling fluid has escaped from channel 45 it flows across the radially inward surface 23a that is formed adjacent the channel 45 of second sealing element 23.

The radially inward surface 23a defines an outwardly sloping surface that is axially concentric with the first sealing element 22 and the second sealing element 23. This outwardly sloping surface preferably has a slope of about two degrees as measured from a reference line parallel to the central axis Y of the gas turbine engine 10. See FIG. 3, angle Φ. The cooling fluid is evenly distributed on the radially inward surface 23a of the second sealing element and provides for substantially uniform dissipation of thermal energy therefrom. As the cooling fluid is released from the second sealing element it is returned to the oil lubrication system.

The second sealing element 23 has an extended portion 50 extending a further distance from the first sealing element 22 than the channel 45 is located from the first sealing element 22. Extended portion 50 is designed to minimize the volume of oil that engages the first sealing element 22. In the preferred embodiment the first sealing element 22 includes a carbon seal element 51. The carbon seal element 51 defines an annular ring that is formed from la plurality of arcuate carbon material segments arranged in an abutting relationship. It is important to minimize the volume of cooling fluid that reaches the carbon seal element 51 so as to not saturate this sealing element with cooling fluid.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid cooled seal arrangement, comprising:

a mechanical housing;

a shaft rotatably mounted within said housing;

a first sealing element coupled to said housing;

a second sealing element connected to said shaft, said second sealing element arranged adjacent to said first sealing element to form rubbing interface therebetween;

a channel on the radially inward side of said second sealing element for receiving cooling fluid therein and allowing escape of received cooling fluid along the entire edge of said channel; and a passageway along said shaft for delivering cooling fluid to said channel for cooling said second sealing element.

2. The fluid cooled seal arrangement of claim 1, wherein said first sealing element is concentrically positioned radially outward from said second sealing element.

3. The fluid cooled seal arrangement of claim 2, wherein said first sealing element includes a first cylindrical surface on its radially inward side, and wherein said second sealing element includes a second cylindrical surface on its radially outward side.

4. The fluid cooled seal arrangement of claim 3, wherein said first sealing element includes a carbon seal element.

5. The fluid cooled seal arrangement of claim 4, wherein said channel is about twice as wide as deep.

6. The fluid cooled seal arrangement of claim 5, wherein said passageway further includes a plurality of openings positioned for releasing cooling fluid to said channel.

7. The fluid cooled seal arrangement of claim 6, wherein said plurality of openings are axially aligned with said channel.

8. The fluid cooled seal arrangement of claim 7, wherein there are at least four of said openings.

9. The fluid cooled seal arrangement of claim 8, wherein there are at least about sixteen of said openings.

10. The fluid cooled seal arrangement of claim 9, wherein said openings are spaced symmetrically about the circumference of said passageway.

11. The fluid cooled seal arrangement of claim 10, wherein said openings are positioned on one end of said passageway.

12. The fluid cooled seal arrangement of claim 11, wherein said openings are rectangular.

13. The fluid cooled seal arrangement of claim 12, wherein said second sealing element includes a substantially solid planar surface extending radially outward from said shaft.

14. The fluid seal arrangement of claim 13, wherein said openings are disposed adjacent said substantially planar surface.

15. The fluid seal arrangement of claim 14, wherein said channel is disposed adjacent said substantially planar surface.

16. The fluid cooled seal arrangement of claim 15, which further includes an axially concentric outwardly sloping surface on the radially inward side of said second sealing element, said axially concentric outwardly sloping surface located adjacent said channel.

17. The fluid cooled seal arrangement of claim 16, wherein the slope of said axially concentric sloping surface is about two degrees.

18. The fluid cooled seal arrangement of claim 17, wherein said passageway is disposed adjacent said shaft.

19. The fluid cooled seal arrangement of claim 18, wherein said passageway has oil in it for cooling fluid.

20. The fluid cooled seal arrangement of claim 19, wherein said second sealing element has its channel positioned adjacent said carbon seal element of said first sealing element.

21. The fluid cooled seal arrangement of claim 20, wherein said second sealing element has an extended portion extending a further distance from said first sealing element than said channel is from said first sealing element.

22. The fluid cooled seal arrangement of claim 1, wherein said second sealing element has its channel positioned adjacent said first sealing element.

23. The fluid cooled seal arrangement of claim 1, wherein said first sealing element includes a carbon seal element.

24. The fluid cooled seal arrangement of claim 1, wherein said passageway further includes a plurality of openings positioned for releasing cooling fluid to said channel.

25. The fluid cooled seal arrangement of claim 1, wherein said passageway is disposed adjacent said shaft.

26. The fluid cooled seal arrangement of claim 1, wherein said passageway has oil in it for cooling.

27. The fluid cooled seal arrangement of claim 1, wherein said channel is about twice as wide as deep.

28. The fluid cooled seal arrangement of claim 1, which further includes an axially concentric outwardly sloping surface on the radially inward side of said second sealing element, said axially concentric outwardly sloping surface located adjacent said channel.

29. The fluid cooled seal arrangement of claim 28, wherein the slope of said axially concentric sloping surface is about two degrees.

30. In combination:

a gas turbine engine; and a fluid cooled seal arrangement within said engine, comprising:

a mechanical housing;

a shaft rotatably mounted within said housing;

a first sealing element coupled to said housing;

a second sealing element connected to said shaft, said second sealing element arranged adjacent to said first sealing element to form rubbing interface therebetween;

a channel on the radially inward side of said second sealing element for receiving cooling fluid therein and allowing escape of received cooling fluid along the entire edge of said channel; and a passageway along said shaft for delivering cooling fluid to said channel for cooling said second sealing element.

31. The fluid cooled seal arrangement of claim 30, wherein said second sealing element has its channel positioned adjacent said first sealing element.

32. The fluid cooled seal arrangement of claim 31, wherein said first sealing element includes a carbon seal element.

33. The fluid cooled seal arrangement of claim 32, wherein said passageway further includes a plurality of openings positioned for releasing cooling fluid to said channel.

34. The fluid cooled seal arrangement of claim 33, wherein said passageway is disposed adjacent said shaft.

35. The fluid cooled seal arrangement of claim 34, wherein said passageway has oil in it for cooling.

36. The fluid cooled seal arrangement of claim 30, wherein said channel is about twice as wide as deep.

37. The fluid cooled seal arrangement of claim 30, which further includes an axially concentric outwardly sloping surface on the radially inward side of said second sealing element, said axially concentric outwardly sloping surface located adjacent said channel.

38. The fluid cooled seal arrangement of claim 37, wherein the slope of said axially concentric sloping surface is about two degrees.

39. A fluid cooled seal arrangement, comprising:

a mechanical housing;

a shaft rotatably mounted within said housing;

a first sealing element coupled to said housing;

a second sealing element connected to said shaft, said second sealing element positioned radially inward and concentric to said first sealing element to form a circumferential rubbing interface therebetween;

a recessed channel on the radially inward side of said second sealing element for receiving cooling fluid therein and allowing escape of received cooling fluid at a plurality of points along its length; and a passageway along said shaft for delivering cooling fluid to said channel for cooling said second sealing element.

* * * * *